June 16, 1925.

V. R. CARTER 1,542,215

FLUID CLUTCH TRANSMISSION FOR MOTOR VEHICLES AND THE LIKE

Filed Jan. 11, 1923

Inventor,
Van Roy Carter
by Hazard & Miller
Attys

Patented June 16, 1925.

1,542,215

UNITED STATES PATENT OFFICE.

VAN ROY CARTER, OF LOS ANGELES, CALIFORNIA.

FLUID-CLUTCH TRANSMISSION FOR MOTOR VEHICLES AND THE LIKE.

Application filed January 11, 1923. Serial No. 611,961.

*To all whom it may concern:*

Be it known that I, VAN ROY CARTER, a citizen of the United States, residing at Los Angeles, in the county of Los Angeles and State of California, have invented new and useful Improvements in Fluid-Clutch Transmissions for Motor Vehicles and the like, of which the following is a specification.

My invention relates to variable speed transmissions, and it particularly refers to certain new and useful improvements in the transmission embodied in my co-pending application, Serial No. 516,077, filed November 18th, 1921.

It is a purpose of my invention to provide a variable speed transmission which permits the employment of a multiplicity of reciprocating units to effectively transmit power from the driving shaft to the driven shaft in any desired ratio, while at the same time reducing the diametrical proportions of the transmission sufficiently to permit of its application to motor vehicles of standard form.

Although I have herein shown and described only one form of variable speed transmission, it is to be understood that various changes and modifications may be made herein without departing from the spirit of the invention and the spirit and scope of the appended claim.

Figure 1:
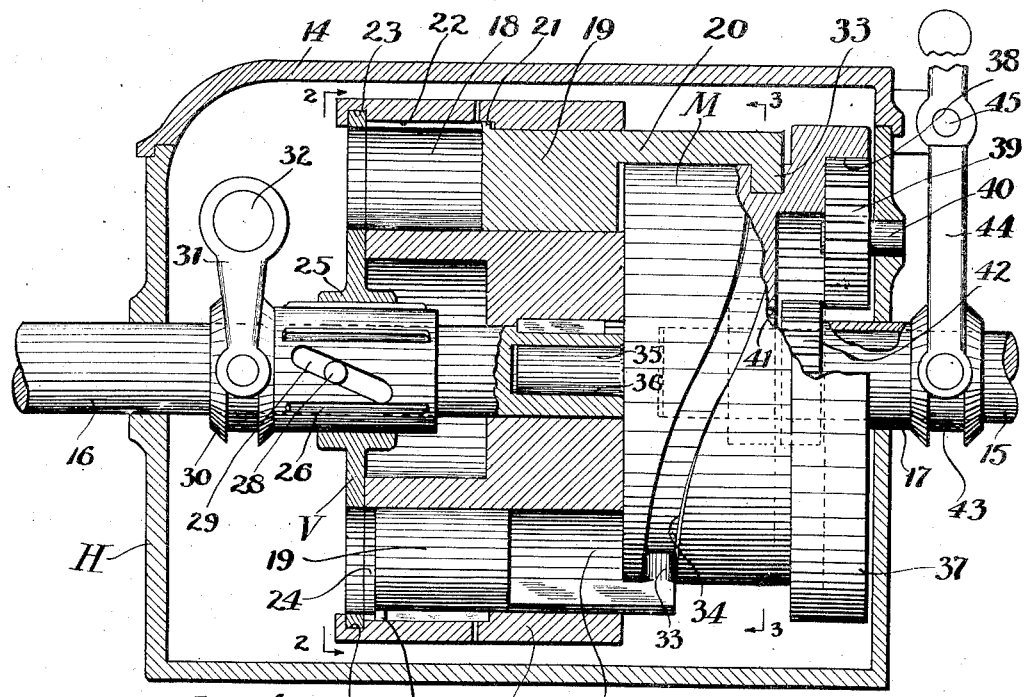
Figure 3:
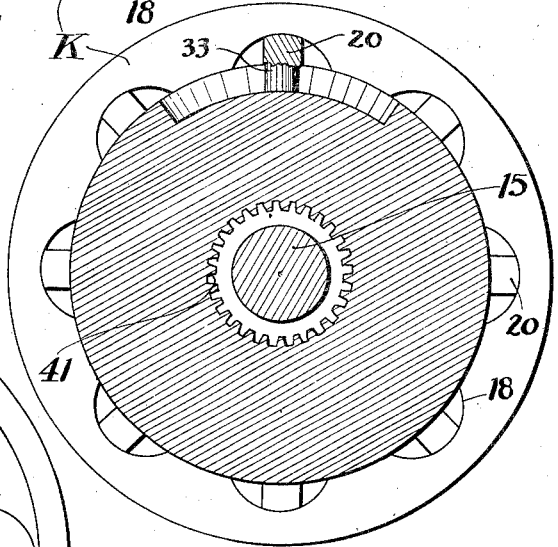
Figure 2:
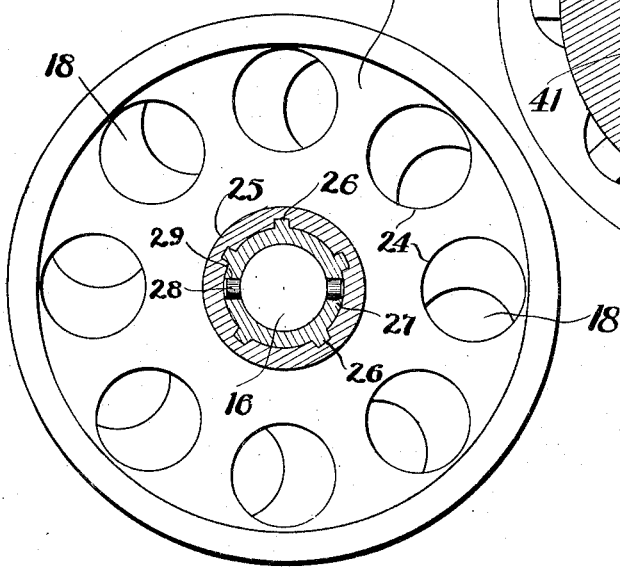

In the accompanying drawings,

Figure 1 is a view showing in vertical section, with portions thereof in elevation, one form of variable speed transmission embodied in my invention, Figures 2 and 3 are vertical sectional views taken on the lines 2—2 and 3—3 of Figure 1.

Referring specifically to the drawings in which similar reference characters refer to similar parts, my invention in its present embodiment comprises a housing H including a removable cover 14 and provided with openings at the end thereof which may be provided with ball bearings (not shown) in which the confronting ends of the driving and driven shafts 15 and 16 are journaled. A sleeve shaft 17 is slidably mounted on but rotatable with the driving shaft 15, and this sleeve shaft is journaled in the corresponding opening in the housing as will be understood.

As illustrated to advantage in Figure 1, a casing K is mounted within the housing for rotational movement with that portion of the shaft 16 disposed within the housing, the casing K being keyed to the latter for this purpose as clearly shown. This casing K comprises in the present instance a circular body provided with a series of circumferentially spaced cylinders 18, all of which are disposed in parallelism with respect to the axis of the body. Working within each of the cylinders 18 is a piston 19 provided with a piston rod 20 which is disposed eccentrically of the longitudinal axis of the piston for a purpose which will become apparent as the description proceeds. For the purpose of locking each piston 19 against rotational movement within the cylinder 18 while at the same time allowing of the unrestricted reciprocation of the piston 19 therein, a key or lug 21 is formed on the piston so as to slide within a groove 22 formed in the wall of the cylinder. Radial ports extend through the shells of the cylinders at the inner ends of the grooves 22 to let the oil out from behind the pins 21.

As clearly shown in Figure 1, the opposite ends of the cylinder 18 are open, one open end allowing of the projection of the piston rods 20 therefrom, while the opposite end is adapted to be controlled by a master valve designated generally at V. As in the other form of transmission embodied in my co-pending application hereinbefore referred to, the housing H of the present transmission is adapted to be completely filled with oil or a similar fluid, and this oil is adapted to oppose movement of the pistons within the cylinders for effecting an operative connection between the driving shaft 15 and the driven shaft 16. The master valve V is adapted to control the passage of oil into and out of the cylinders 18, and as clearly shown in Figure 2, this valve comprises a disc mounted for rotational movement within an annular groove 23 formed in the casing K. The disc is provided with an annular series of circumferentially spaced ports 24 which are adapted to be moved into or out of registration with the adjacent ends of the cylinders 18 in controlling the passage of fluid to and from the cylinders. The disc of the valve is provided with a hub portion 25 grooved to receive ribs 26 formed on a sleeve 27, the sleeve in turn being slidably mounted upon the driven shaft 16 but keyed thereto for rotational movement with the shaft by means of a pin 28, mounted in spirally disposed cam slots 29 formed in the sleeve 27. A collar 30 is fixedly secured to the sleeve 27, and a fork 31 engages the collar 30 for effecting movement of the sleeve longitudinally upon the shaft 16. The fork 31 is in turn fixed to a shaft 32 which extends from the housing H for operative connection to a manually operable lever (not shown) adapted to be disposed in convenient position for operation by the driver of the motor vehicle.

As shown in Figures 1 and 3, the outer ends of the piston rods 20 are provided with pins or lugs 33 adapted to work within a cam slot 34 formed in a power conveying member designated generally at M. This member M is provided at one side with a stub shaft 35 rotatably mounted in a recessed end 36 of the shaft 16. The opposite side of the member M is provided with an annular flange 37 formed on the interior thereof with a ring gear 38 which is adapted to constantly mesh with a pinion 39 fixed to a shaft 40 journaled in the housing H. An internal ring gear 41 is formed axially of the member M for engagement with a gear 42 fixed to the inner end of the sleeve shaft 17, and it will be noted that the member M is recessed at its axis to accommodate the adjacent end of the driving shaft 15 so that the latter will freely rotate within the member. A grooved collar 43 is fixed to the sleeve shaft 17 and is adapted to be engaged by the forked end of a lever 44 fulcrumed at the point indicated at 45 and extending to a convenient position for operation by the driver of the motor vehicle. This lever 44 is the equivalent of a gear shifting lever, and by operation of the same the sleeve shaft 17 and consequently the gear 42 can be moved to engage the pinion 39 or the gear 41.

The operation of the transmission is as follows:

By rotation of the driving shaft 15, the sleeve shaft 17 is likewise rotated, and when the sleeve is in the neutral position shown in Figure 1, no movement is imparted to the power conveying member M so that the driven shaft 16 is at rest. However, when the sleeve is moved to cause the gear 42 to mesh with the gear 41, rotation of the member M is effected thereby imparting rotational movement to the casing K so that the cylinders 18 describe a circular path. Under the action of the pins 33 engaging within the cam slot 34, the pistons 19 are reciprocated within the cylinders 18. When the valve V is in closed position or in such position that the ports 24 are out of registration with the open ends of the cylinders 18, the oil trapped within the cylinders serves to resist the reciprocating movement of the pistons so that motion is imparted to the shaft 16 from the shaft 15. When the valve V is moved to open or partly opened position by an actuation of the sleeve 27 through rotation of the shaft 32, the oil is allowed to circulate into and out of the cylinders, thus allowing of the reciprocating movement of the pistons. When the valve V is in fully opened position, the resistance offered by the oil is practically nil to that the pistons are free to move within the cylinders so as to prevent the transmission of motion from the driving shaft 15 to the driven shaft 16. However, as the valve is moved to closed position, an operative connection is established between the driving shaft and the driven shaft through the medium of the piston and cylinder units so that the rotational speed of the driven shaft increases until it reaches the maximum or the same speed as the driving shaft, when the valve is in completely closed position. It will thus be seen that any rotational speed may be imparted to the driven shaft depending upon the position of the valve V.

In driving a vehicle forwardly, the gear 42 is in mesh with the gear 41, but to effect a rearward movement of the vehicle, the gear 42 is moved to meshing engagement with the pinion 39 so that the member M is rotated in a reverse direction. Irrespective of whether the vehicle is being moved forwardly or rearwardly, the valve V can be manipulated to control the rotational speed of the driven shaft 16 so that the speed of the vehicle can be controlled accordingly.

I claim as my invention:

In a fluid clutch transmission, a driving shaft, a driven shaft, a motion conveying member adapted for operative connection with the driving shaft, said member being formed with a cam groove, piston and cylinder units fixed to the driven shaft, rods on the pistons, extensions formed on the rods of said pistons and engaging with said cam groove, a housing adapted to contain fluid, a valve fitting against the ends of the cylinder units and having openings adapted to register with the cylinders, said valve having a hub portion, a sleeve slidingly mounted on the driven shaft and having ribs to engage in grooves in the hub portion, the sleeve being connected to the driven shaft by pins fixed in the driven shaft and extending into cam slots in the sleeve, a collar extending from the sleeve, and a fork engaging the collar so that by operating the fork the sleeve may be reciprocated to rotate the valve to control the outlets of the cylinders.

In testimony whereof I have signed my name to this specification.

VAN ROY CARTER.